United States Patent [19]
Olesen

[11] Patent Number: 5,495,773
[45] Date of Patent: Mar. 5, 1996

[54] APPARATUS FOR WEIGHING CONTINUOUSLY FLOWING FLOWABLE MATERIAL

[75] Inventor: Henry T. Olesen, Fuengirola, Spain

[73] Assignee: Cimbria Unigrain Ltd. A/S, Denmark

[21] Appl. No.: 284,623

[22] PCT Filed: Feb. 12, 1994

[86] PCT No.: PCT/DK92/00045

§ 371 Date: Oct. 17, 1994

§ 102(e) Date: Oct. 17, 1994

[87] PCT Pub. No.: WO93/16356

PCT Pub. Date: Aug. 19, 1993

[51] Int. Cl.⁶ .................................................. G01F 1/30
[52] U.S. Cl. ................................................. 73/861.73
[58] Field of Search ...................... 73/861.73, 861.71, 73/12.11, 862.042, 862.043; 222/77, 185

[56] References Cited

U.S. PATENT DOCUMENTS 4,157,661  6/1979  Schindel ............................. 73/861.73
4,637,262  1/1987  Vesa ................................... 73/861.73
5,065,632  11/1991  Reuter ............................... 73/861.73

Primary Examiner—Richard Chilcot
Assistant Examiner—Harshad Patel
Attorney, Agent, or Firm—Dorsey & Whitney

[57] ABSTRACT

An apparatus for weighing continuously flowing flowable material, in which the mass flow is determined as a function of measurements of forces exerted on at least one plate (1) in contact with the flowing material. The apparatus is adapted to perform at least two of the measurements in substantial dependence of the distribution of weight, such as between third points (A, B), on a basically rectilinear inclined plate, on which the material flows slidingly. The results of the measurements may be used for creating an expression of the mass flow, the accuracy of which is independent of the flow velocity, density and friction of the material.

4 Claims, 3 Drawing Sheets

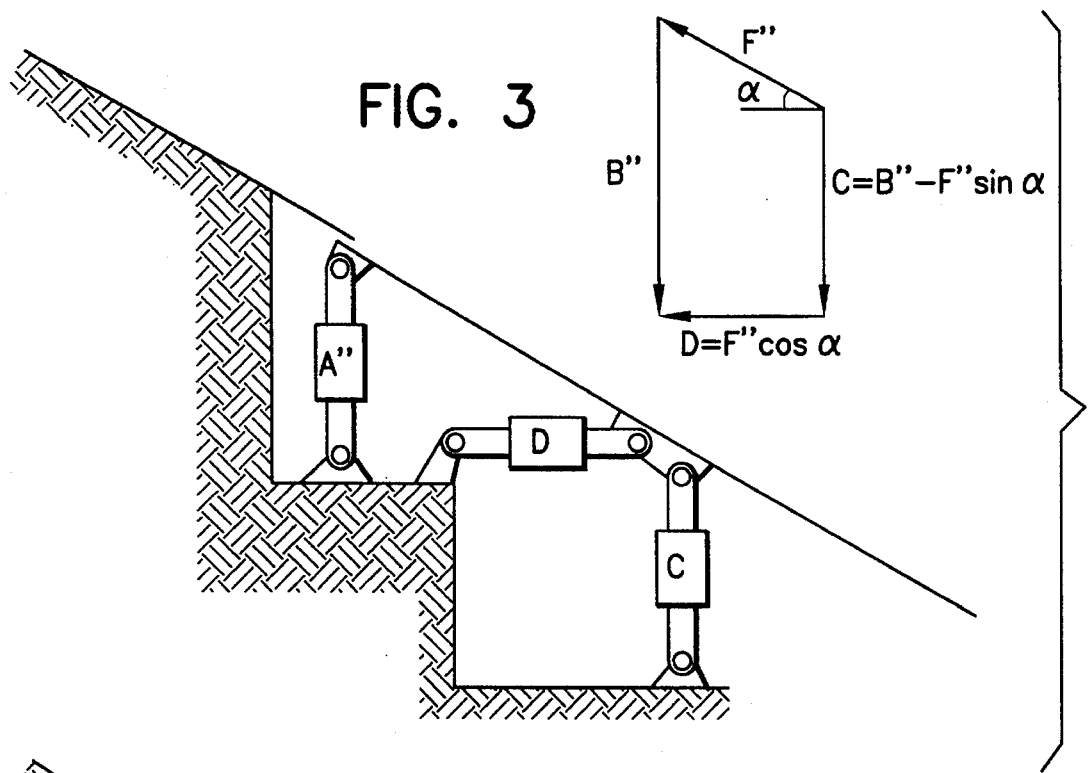
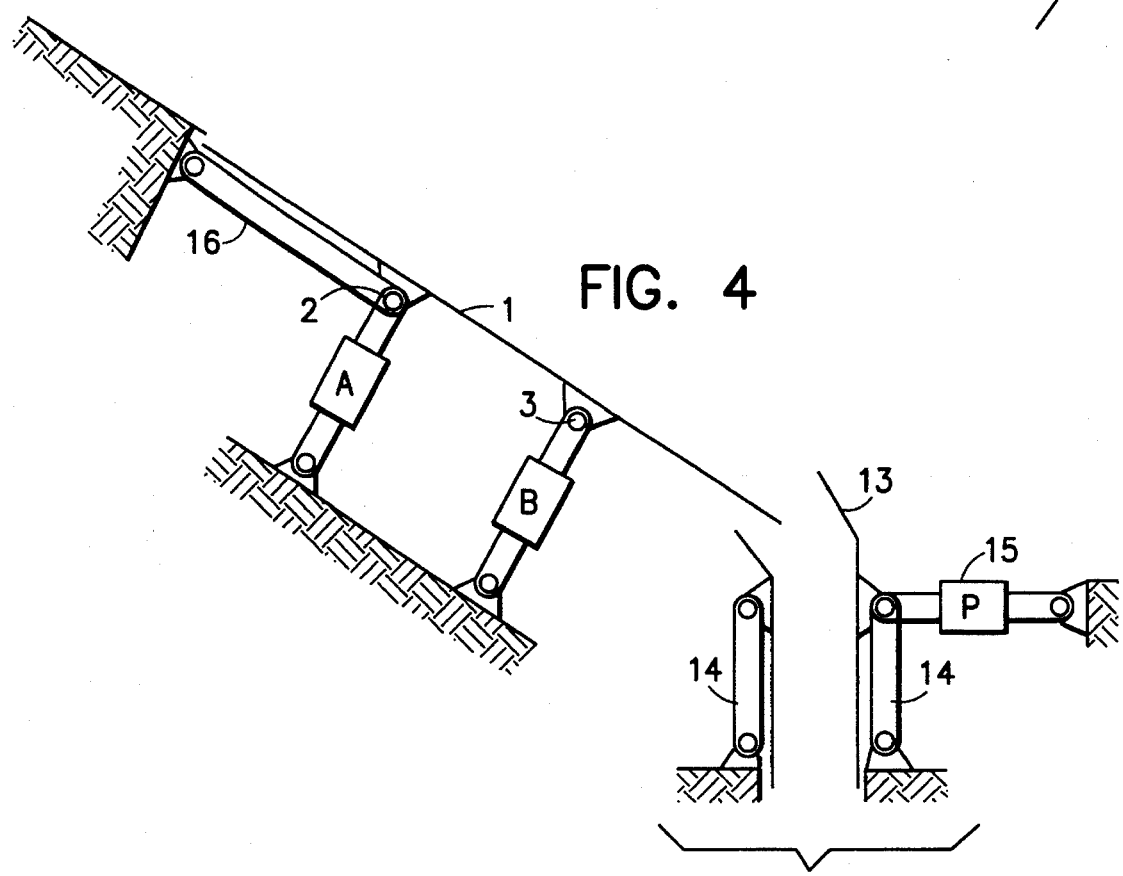

5,495,773

APPARATUS FOR WEIGHING CONTINUOUSLY FLOWING FLOWABLE MATERIAL

TECHNICAL FIELD

The present invention relates to an apparatus for weighing a continuous stream of granular or powdery material flowing freely under the influence of gravity.

BACKGROUND ART

An apparatus of the kind referred to above is disclosed in the international patent application WO 89/11082. This known apparatus comprises an inclined plane plate, on which the material passes slidingly, while the weight of the amount of material present on the plate at each instant is registered by the force it exerts against the plate. Thus, the weight of material being present on a known length of plate, in connection with a measured flow velocity, is utilized to determine the mass flow.

In addition to the requirement that this velocity measurement is to be carried out with the sufficient precision independently of the thickness of the layer of the flowing material (and the consequent differences in radius from the axis of the measuring drum), it is a prerequisite for this arrangement to function correctly, that the flow velocity on the whole plate is uniquely determined by the outlet velocity. This is normally not the case, as a coefficient of friction, that is smaller or greater than the tangent to the angle of inclination of the plate relative to the horizontal, will cause an acceleration or a deceleration respectively of the material, so that the mean velocity over the plate will be smaller or greater respectively than the outlet velocity as measured.

DISCLOSURE OF THE INVENTION

It is the object of the present invention to provide an apparatus of the kind initially referred to, with which it is possible to achieve a more accurate measurement of the mass flow independently of the various parameter variations reducing the accuracy of the previously known apparatus discussed above, and this object is achieved with an apparatus, which according to the present invention, the apparatus is attached to perform at least two of said measurements in substantial dependence on the distribution of weight on a basically rectilinear inclined plate, on which the material flows slidingly.

Thus, while the above-mentioned known weighing apparatus does not take into account the variations in the velocity of the material during the sliding movement on the plate, the weighing apparatus according to the present invention thus in fact exploits the variation in velocity from inlet to outlet caused by friction and inclination, as the invention is substantially based on measuring the distribution of the material on the plate in combination with either a measurement of the frictional force on the latter and/or the force required to deflect the stream of flowing material (such a measurement is known per se from several patent publications, such as U.S. Pat. No. 4,637,262, German patent specification No. 3,410,845 and German patent specification No. 3,541,872. Examples of exactly how it is possible to use the results of these measurements to produce an expression for the mass flow, which is independent of the unknown values for flow velocity and frictional resistance, will be explained below with reference to the drawings.

BRIEF DESCRIPTION OF THE DRAWINGS

In the following detailed portion of the present specification, the present invention will be explained in more detail with reference to the drawings, in which, FIGS. 2–5 show five different exemplary embodiments of an apparatus according to the present invention as envisaged for use in measuring mass flow of grain (cereals).

DESCRIPTION OF THE PREFERRED EMBODIMENT

For a sliding movement with friction on an inclined plate 1 being restricted against longitudinal movement and transversely supported in its "third points", i.e. the two points dividing the length L of the plate into three equally long parts L/3 as shown, it can be shown that the ratio A/B between the forces exerted in the upper and lower points of support 2 and 3 respectively equals the ratio $v_2/v_1$ between the inlet and outlet velocities of the material. This relation can be proved on the basis of the ordinary equations relating to movement, the only prerequisite being that the coefficient of friction can be considered as being constant over the full length of the inclined plate 1. Further, the passage time along a plate with length L (m) is equal to $2L/(v_1=v_2)$, the latter multiplied with the mass flow M (kg/s) and the acceleration of gravity g (m/s$^2$) giving the gravitational force exerted by the flowing material on the plate, this again being equal to $(A+B)/\cos \alpha$, where $\alpha$ is the angle of inclination of the plate relative to the horizontal.

With the frictional force F $(=\mu(A+B))$ as measured, the acceleration will be:

$a=g \cdot (\sin \alpha - F \cdot \cos \alpha/(A+B))$, with $v_2^2 - v_1^2 = 2 \cdot L \cdot a$ leading to the equation:

$$M = (A+B) \sqrt{\frac{(A+B) \cdot \tan\alpha - F}{2 \cdot g \cdot L \cdot \cos\alpha \cdot (A-B)}},$$

this being theoretically correct for all values of flow velocities and coefficients of friction.

Figure 2:
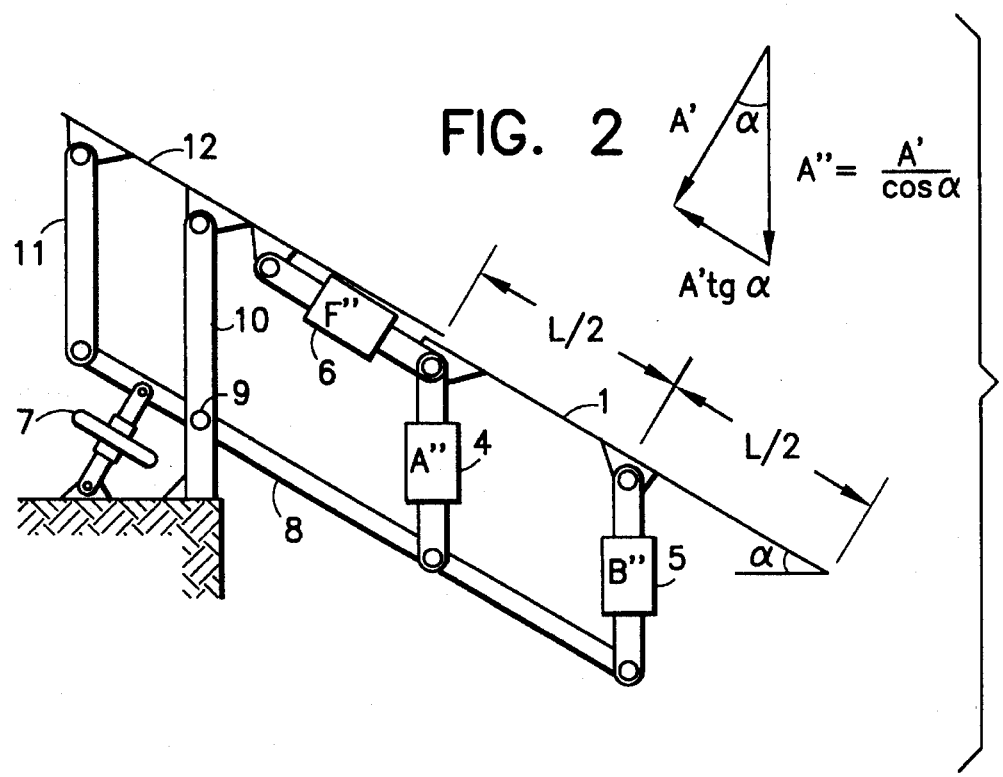

The two weighing points for the inclined plate 1 may be situated in other positions than the third points. If for example, as shown in FIG. 2, the lower transverse support is placed in the mid-point of the plate instead of in its lower third point, while the upper support is moved to the top edge of the plate, then the force exerted will be changed to $A'=(A-B)/3$ above and $B'=(A+2B)2/3$ below, which when inserted in the equation for determining M will give $$M = (A'+B') \sqrt{\frac{(A'+B') \cdot \tan\alpha - F}{6 \cdot g \cdot L \cdot \cos\alpha \cdot A'}}.$$

By thus replacing the difference between the two measurements of A and B by the single measurement of A', errors caused by even small discrepancies between the constants of the two weighing cells will be avoided in cases where the magnitude A-B is much smaller than each of the magnitudes of A and B.

It is a necessary condition that the angle of inclination $\alpha$ always differ from the friction angle, as both numerator and denominator approach zero, when the coefficient of friction approaches $\tan\alpha$, whereby the flow velocity (and hence the thickness of the layer of material) becomes constant.

Since the absolute magnitude of the forces in relation to a given mass flow decreases rapidly with an increase in the inclination of the plate, the above-mentioned necessary condition implies a limitation of the practical accuracy of this method in cases, where large variations in the friction between the flowing material and the plate can be expected, e.g. because of variations in the material's water content.

In such cases, a substantial improvement of the accuracy may be achieved by adjusting the angle of inclination of the inclined plate depending on the material's coefficient of friction, so as to achieve an optimal increase in velocity from the inlet velocity $v_1$ to the outlet velocity $v_2$ together with the consequent distribution of weight on the plate. The exemplary embodiment of a weighing apparatus according to the invention shown in FIG. 2 is well suited to such an angular adjustment, the inclined plate 1 in this case being supported vertically with the result that the reaction forces A' and B' on the plate in the equation above in this case are resolved into vertical forces A"=A'/cos $\alpha$ and B"=B'/cos $\alpha$, both being measured directly through the load on the weighing cells 4 and 5, and the components in the plane of the plate, i.e. A'tan $\alpha$ and B'tan $\alpha$ acting at an oblique angle upwardly in the plane of the plate.

As the sum of these components of force exceeds the frictional force F, the resultant force in the plane of the plate will be directed opposite to the direction of movement of the material and will be equal to F"=(A'+B')tan $\alpha$–F, the latter being measured through the weighing cell 6.

Insertion in the expression above for the mass flow M will now produce an expression, which is independent of the angle $\alpha$, while at the same time all difference values between measured forces are eliminated, viz.:

$$M = (A'' + B'')\sqrt{\frac{F''}{6gLA''}}$$

The angle of the inclination $\alpha$ is adjusted by means of the adjustment screw 7, being adapted to hold the beam 8 in the desired position relative to its pivot point 9 on the fixed vertical column 10, the latter together with a linkage rod 11 ensuring that the inlet plate 12 is parallel to the beam 8 and the plate 1 parallel to this beam.

For materials with a coefficient of friction $\mu$ in the interval $0.2 < \mu < 0.5$ a fixed angle $\alpha$=approx. 45° will often give acceptable results, and the exemplary embodiment of the apparatus shown in FIG. 3, adapted to measure a horizontal component D =F"cos $\alpha$ in combination with the vertical reaction force C=B"–F"sin $\alpha$, will in many cases be more useful, because in practice, measuring the force F" in the plane of a plate may be difficult to achieve. The vertical force component A" in the upper edge of the plate will in this case remain unaltered, and the mass flow is determined by the equation:

$$M = (A'' + C + D\tan\alpha)\sqrt{\frac{D}{6gL\cos\alpha A''}}$$

Another exemplary embodiment of the weighing apparatus according to the invention, in which the weighings with the inclined plate are combined with measurements of the deflection force on a basically vertical collision plate is shown in FIG. 4, in which the material leaving the inclined plate 1 impacts against the rear wall of a vertical exit duct 13, the latter being supported by vertical linkage rods 14, so that solely the horizontal deflection force P acts upon the weighing cell 15.

Figure 1:
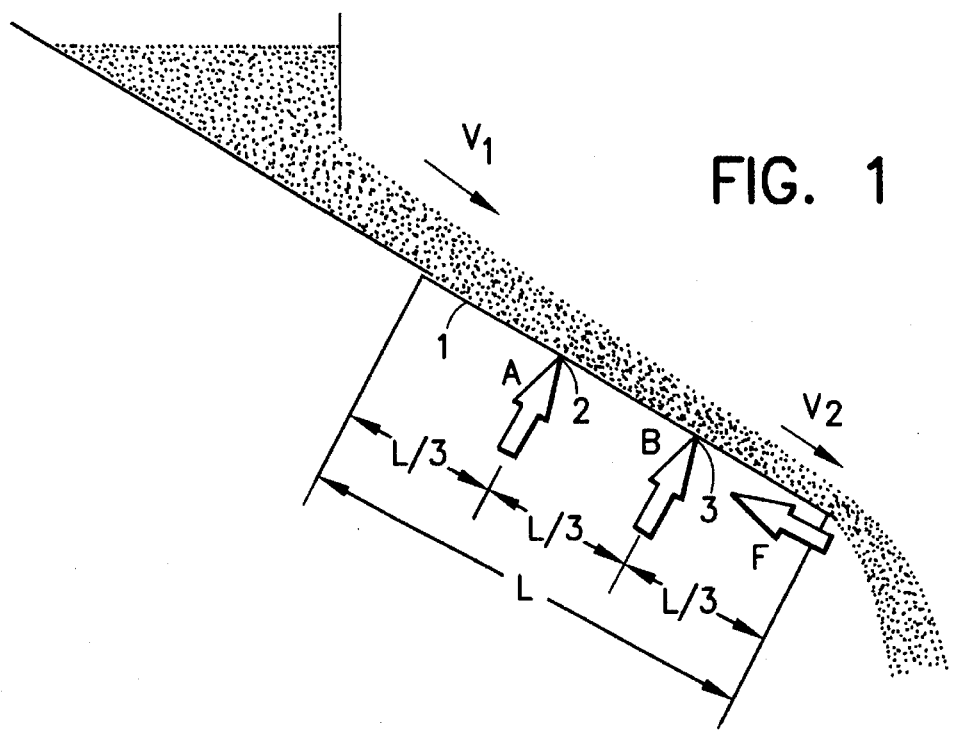
FIG. 1 shows the basic principles of the present invention.

The plate 1 is supported perpendicularly to its longitudinal direction in the points 2 and 3, in which the forces A and B are measured by means of weighing cells in exactly the same manner as in the diagrammatic FIG. 1, while in this case it is not necessary to measure the longitudinally exerted force acting upon the rod 16.

On the basis of the two equations for the mass flow $$M = \frac{(A+B)^2 v_2}{2gL\cos\alpha A} \text{ and } M = \frac{P}{v_2 \cos\alpha}$$

multiplication and extraction of roots will give $$M = \frac{A+B}{\cos\alpha}\sqrt{\frac{P}{2gLA}},$$

as the unknown velocity $v_2$ disappears.

Thus, in this embodiment, the measurement of the frictional force F in the embodiments described above is replaced by measurement of the deflection force P, but by in this case additionally measuring the frictional force F, a double assurance for the accuracy of the result may be achieved, as a combined calculation based on measuring all four parameters A, B, F and P will produce a highly reliable result. In the embodiment according to FIG. 4 also, it is possible to support the inclined plate 1 in other positions than the third points, as these have solely been chosen to simplify the explanation.

Figure 5:
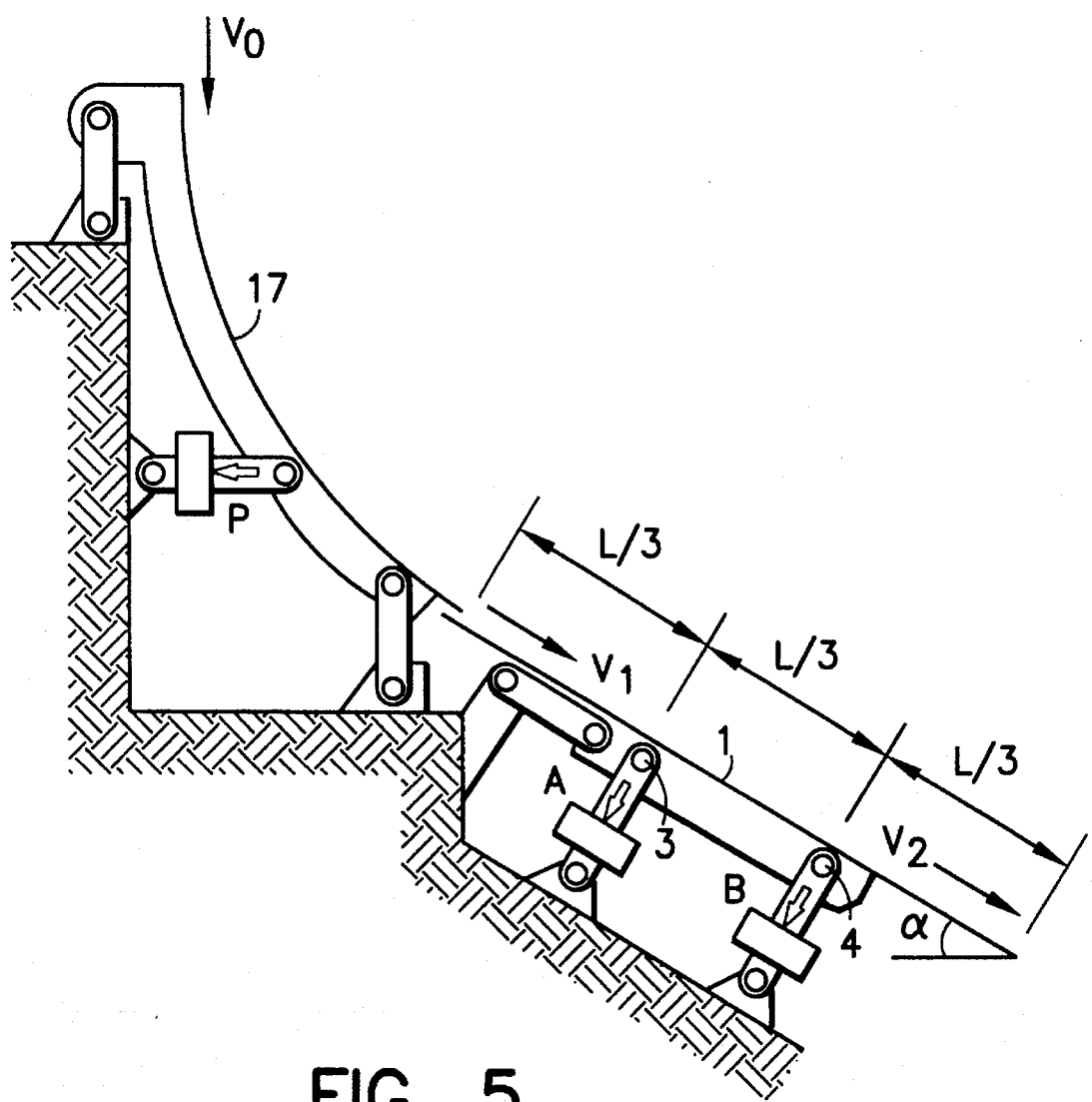

At times it may be practically advantageous as shown in FIG. 5 to place the inclined plate 1 downstream of the deflection plate 17, the latter in this case preferably being curved and arranged with a vertical inlet and an outlet in the direction of the inclined plate 1, as well as being provided with a weighing cell 18 to measure the deflection force P. As in this case, the inlet velocity $v_1$ on the inclined plate 1 will be used in the calculation instead of the outlet velocity $v_2$, the mass flow M may be determined using the above equation by interchanging A and B.

| LIST OF PARTS |
| --- |
| 1 inclined plate |
| 2 upper point of support |
| 3 lower point of support |
| 4 weighing cell |
| 5 weighing cell |
| 6 weighing cell |
| 7 adjustment screw |
| 8 beam |
| 9 pivot point |
| 10 column |
| 11 linkage rod |
| 12 inlet plate |
| 13 exit duct/outlet deflection plate |
| 14 linkage rod |
| 15 weighing cell |
| 16 rod |
| 17 inlet deflection plate |
| 18 weighing cell |

I claim:
1. Apparatus for weighing continuously flowing granular or powdery material, in which the mass flow is determined as a function of measurements of forces exerted on an inclined plate, which is substantially rectilinear in the direction of flow and on which the flowing material flows slidingly, wherein a) said plate is supported at two different levels by first force-measuring means capable of measuring forces, of which the gravitational force exerted by the material flowing upon the plate at each of said two levels comprises as a calculable component the force exerted by the flowing material on the plate in a vertical plane and at right angles to the direction of flow, and either a1) by a second force-measuring means capable of measuring the frictional force exerted by the flowing material upon said first plate and/or a2) by a second plate placed in the path of the flow of material and adapted to change the direction of the flow having third force-measuring means capable of measuring solely the force, with which the flow is deflected to change its direction, as well as b) by calculating means for calculating the mass flow from b1) the forces as measured by said first force-measuring means or as calculated from such measurements, and either b2) from the frictional force as measured by said second force-measuring means, and/or b2b) from the deflection force as measured by said third force-measuring means 2. Apparatus according to claim 1, wherein a) said first force-measuring means are adapted to measure reaction forces in the third points of the plate normal to the latter, b) said second force-measuring means are adapted to measure the frictional reaction force in the longitudinal direction of the plate, and c) in that said calculating means are adapted to calculate the mass flow as $$M = (A+B)\sqrt{\frac{(A+B)\cdot\tan\alpha - F}{2\cdot g\cdot L\cdot\cos\alpha\cdot(A-B)}}$$

in which

A and B are said forces

L is the length of the plate, $\alpha$ is the angle of inclination of the plate relative to the horizontal, and g is the acceleration of gravity.

3. Apparatus according to claim 1, wherein a) said first force-measuring means are adapted to measure reaction forces at an upper edge and the mid-point of the plate respectively, b) said second force-measuring means are adapted to measure the frictional reaction force in the longitudinal direction of the plate, and c) said calculating means are adapted to calculate the mass flow as $$M = (A'+B')\sqrt{\frac{(A'+B')\cdot\tan\alpha - F'}{6\cdot g\cdot L\cdot\cos\alpha\cdot A'}}$$

or, if the first force-measuring means are vertical, $$M = (A''+B'')\sqrt{\frac{F''}{6gLA''}},$$

in which A', A'', B' and B'' are reaction forces

L is the length of the plate (1), $\alpha$ is the angle of inclination of the plate relative to the horizontal, and g is the acceleration of gravity.

4. Apparatus according to claim 1 and having a second plate placed in the path of the flow of material and adapted to change the direction of the flow having third force-measuring means capable of measuring solely the force, with which the flow is deflected to change its direction, wherein said calculating means are adapted to calculate the mass flow as $$M = \frac{A+B}{\cos\alpha}\sqrt{\frac{P}{2g\cdot LB}} \text{ and}$$

$$\frac{A+B}{\cos\alpha}\sqrt{\frac{P}{2g\cdot LA}} \text{ respectively,}$$

in which is the horizontal force of deflection,

A and B are said forces,

L is the length of the plate $\alpha$ is the angle of inclination of the plate relative to the horizontal, and g is the acceleration of gravity.

* * * * *